United States Patent Office 3,245,921
Patented Apr. 12, 1966

3,245,921
CHELATE POLYMERS
Edward J. Friihauf, Mentor, Ohio, and James P. Bonsack,
Aberdeen, Md., assignors to J. T. Baker Chemical Company, Phillipsburg, N.J., a corporation of New Jersey
No Drawing. Filed Mar. 20, 1963, Ser. No. 266,504
16 Claims. (Cl. 260—2)

This invention relates to polymers consisting essentially of recurring chelate units. In a particular aspect, this invention relates to chelate polymers of titanium, tin, and silicon which have utility in coating, molding, and encapsulating applications where high temperature heat stability is essential.

The chelate polymers of the present invention consist essentially of structures represented by the general formula:

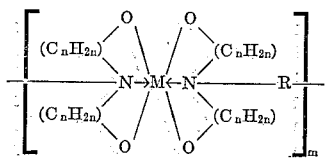

where M is titanium, tin, or silicon, R is a divalent aliphatic or aromatic radical containing between 2 and about 20 carbon atoms, $m$ is a whole integer having a value of at least 2, and $n$ is the integer 2 or 3, with the proviso that M is silicon when the nitrogen atoms of the recurring chelate units are separated by R of 2 carbon chain length. The preferred chelate polymers of the present invention are those having a softening point above 300° C.

The invention polymers are prepared by a method which comprises reacting a tetraalkoxide of titanium, tin, or silicon with a N,N,N',N'-tetrakis(hydroxyalkyl)diamine. Illustrative of the process is the reaction of N,N,N',N'-tetrakis(2-hydroxyethyl)ethylenediamine with silicon tetraethoxide:

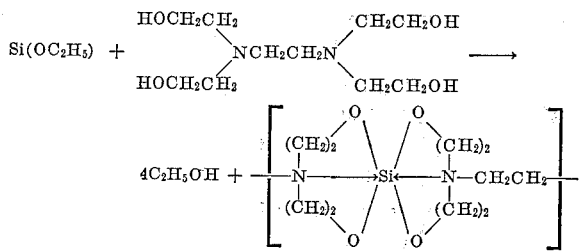

The process is preferably conducted employing a lower alkanol tetraalkoxide in order to permit continuous removal of the alkanol by-product during the course of the reaction. Removal of the alkanol shifts the reaction equilibrium in favor of polymer formation. Generally it is desirable to conduct the reaction in a solvent medium at a temperature sufficiently high to permit volatilization of the alkanol by-product. Solvents employed are those having the proper solubility characteristics such as tertahydrofuran, dimethylsulfoxide, dimethylformamide, dimethylacetamide, and the like, and having a higher boiling point than the particular alkanol by-product.

The ratio of quantities of tetraalkoxide to N,N,N',N'-tetrakis(2-hydroxyethyl)diamine employed can vary over a broad range. Preferably, the reactants are employed in approximately equimolar quantities, e.g., 0.5 to 1.5 moles of tetraalkoxide for each mole of diamine reacted.

The lower molecular weight polymers of this invention are less tough and have solubility in a greater variety of solvents than the higher molecular polymers. The average molecular weight of the polymers will range from where $m$ is 2 in the above general formula up to 20 and higher.

The invention chelate polymers have solubility in one or more solvents and can be cast as films and coatings. The chelate polymers have outstanding heat stability, and many of the polymers can withstand prolonged exposure to temperatures of 300° C. and higher. An unusual feature of many of the polymers is their solubility in water. The chelate polymers which have a particularly superior combination of heat stability and other properties are those wherein M in the general formula is silicon. For example, a polymer prepared from silicon tetraethoxide and N,N,N',N'-tetrakis(2-hydroxyethyl)-p-phenylenediamine was able to withstand a temperature of 360° C. without any apparent change.

EXAMPLE 1

Reaction of silicon tetraethoxide with N,N,N',N'-tetrakis (2-hydroxyethyl)ethylenediamine A flask fitted with fractionating column and stirring equipment was charged with silicon tetraethoxide (10.9 grams, 0.052 mole), N,N,N',N'-tetrakis(2-hydroxyethyl) ethylenediamine (12.0 grams, 0.05 mole), and dimethylacetamide (47 grams). The reaction mixture was heated to a temperature sufficiently high to cause continuous distillation of ethanol out of the reaction medium. When 73 percent of the theoretical quantity of ethanol had been recovered, the red reaction mixture became very viscous. After cooling to room temperature, the reaction mixture was subjected to reduced pressure to remove volatile components. The gelatinous solid product was worked into 200 milliliters of benzene with heating and stirring. This solution was cooled and poured into anhydrous ether and the product separated as a rubbery material. The product was then suspended in refluxing benzene and the suspension was mixed with a volume of ether. The solid resin product was recovered, washed with ether, and dried in a vacuum oven.

The resin product was a tough solid which was soluble in water and ethanol, and insoluble in acetone, benzene, chloroform, petroleum ether, dimethylformamide, and diethyl ether. The resin was found to decompose at a temperature of about 330° C. An aqueous solution of the resin did not appear to be affected by either acid or an alkali. A clear film was cast from an aqueous solution of the resin product.

EXAMPLE 2

Reaction of silicon tetraethoxide with N,N,N',N'-tetrakis (2-hydroxyethyl)-para-phenylenediamine N,N,N',N'-tetrakis(2-hydroxyethyl) - para-phenylenediamine (14.2 grams, 0.05 mole), 50 milliliters of dimethylacetamide, and 10 milliliters of toluene were charged to a flask fitted with a fractionating column. The reaction medium was dried by azeotropic distillation of toluenewater. Silicon tetraethoxide (10.4 grams, 0.05 mole) was added and the reaction mixture was heated to a temperature sufficiently high to permit continuous removal of ethanol as it was formed. After 88 percent of the theoretical quantity of ethanol was collected, the reaction mixture set into a firm gel. The reaction mixture was worked in hot benzene and then methanol with the aid of a high shear agitator. The solid product in suspension was filtered, washed with methanol, and dried in a vacuum oven.

The hard, solid resin had some solubility in water, methanol, dimethylformamide, and dimethylsulfoxide, and was insoluble in acetone, benzene, petroleum ether, diethyl ether, and tetrahydrofuran. The resin product was soluble in sodium hydroxide and formed a green solution. No apparent change occurred when the solid resin was heated at a temperature of 360° C.

EXAMPLE 3

*Reaction of titanium tetraisopropoxide with N,N,N',N'-tetrakis(2-hydroxyethyl)-para-phenylenediamine*

N,N,N',N'-tetrakis(2-hydroxyethyl) - para-phenylenediamine (14.4 grams, 0.05 mole), 50 grams of dimethylacetamide, and 10 milliliters of toluene were charged to a flask. After the reaction medium was dried by azeotropic distillation of toluene-water, titanium tetraisopropoxide (14.2 grams, 0.05 mole) was added to the reaction mixture. Almost immediately a resinous solid began to separate. The reaction medium was heated until over 92 percent of the theoretical quantity of isopropanol was collected by distillation. The finely divided resinous product was collected by filtration, washed with dimethylacetamide, and then ground in a mortar in an acetone medium. The product was dried to constant weight in a vacuum oven to yield an olive green solid resin.

The resin darkened somewhat when heated up to 360° C. but remained a solid. The resin was partially soluble in water and in methanol. It was soluble in aqueous hydrochloric acid, and it was insoluble in acetone, benzene, chloroform, petroleum ether, dimethylformamide, diethyl ether, dimethylsulfoxide, and tetrahydrofuran.

EXAMPLE 4

*Reaction of tin tetraethoxide with N,N,N',N'-tetrakis(2-hydroxyethyl)-para-phenylenediamine*

N,N,N',N'-tetrakis(2-hydroxyethyl) - para-phenylenediamine (6.25 grams, 0.02 mole), 50 grams of dimethylacetamide, and 10 milliliters of dry toluene were charged to a flask and dried by azeotropic distillation. Tin tetraethoxide (6.50 grams, 0.02 mole) was added to the reaction mixture, and upon warming, the entire reaction medium solidified. One hundred milliliters of dimethylacetamide was added and the solid was broken and dispersed with warming. Over 90 percent of the theoretical amount of ethanol was collected by distillation. The clear resinous product was recovered and dried in a vacuum oven.

The resin product partially melted at about 300° C. and was not completely melted at a temperature of 360° C. The resin was soluble in water, in methanol, in aqueous hydrochloric acid, and aqueous sodium hydroxide; and the product was insoluble in acetone, benzene, chloroform, petroleum ether, dimethylformamide, diethyl ether, dimethylsulfoxide, and tetrahydrofuran.

EXAMPLE 5

*Reaction of silicon tetraethoxide with N,N,N',N'-tetrakis(2-hydroxyethyl)hexamethylenediamine*

In the manner of the previous examples, N,N,N',N'-tetrakis(2 - hydroxyethyl)hexamethylenediamine (9.5 grams, 0.03 mole), 175 milliliters of dimethylacetamide, and silicon tetraethoxide (6.76 grams, 0.03 mole) were mixed, and ethanol was continuously removed by distillation. A small amount of insoluble solids was removed and the remaining viscous solution was stripped under reduced pressure to yield a rubbery resinous product. After prolonged drying in a vacuum oven, the product was in the form of a yellow rubbery solid.

The resin product darkened but did not melt at a temperature of 360° C. The product was soluble in aqueous sodium hydroxide, in methanol, and in water, and it was insoluble in acetone, benzene, chloroform, petroleum ether, dimethylformamide, diethyl ether, dimethylsulfoxide, and tetrahydrofuran. A coating is formed when a solution of the resin is applied to a surface.

EXAMPLE 6

*Reaction of tin tetraethoxide with N,N,N',N'-tetrakis(2-hydroxyethyl)hexamethylenediamine*

N,N,N',N' - tetrakis(2 - hydroxyethyl)hexamethylenediamine (6.07 grams, 0.02 mole) was reacted with tin tetraethoxide (5.97 grams, 0.02 mole) to yield a white resinous precipitate from dimethylacetamide.

After drying to constant weight, the product was in the form of a white powder. A sample of the resin sintered at about 220° C. The resin was soluble in water, methanol, in aqueous acid, and in aqueous sodium hydroxide and was insoluble in benzene, chloroform, petroleum ether, diethyl ether, dimethylsulfoxide, dimethylformamide, and tetrahydrofuran.

EXAMPLE 7

*Reaction of titanium tetraisopropoxide with N,N,N',N'-tetrakis(2-hydroxyethyl)hexamethylenediamine*

N,N,N',N' - tetrakis(2 - hydroxyethyl)hexamethylenediamine (5.99 grams, 0.02 mole) was reacted with an equimolar quantity of titanium tetraisopropoxide and there was an immediate white precipitate formed. Ninety-four percent of the theoretical amount of isopropanol was recovered by distillation. The final product, after drying in a vacuum oven, was in the form of a finely divided solid.

The resin melted at about 200° C. and darkened a little on heating up to 350° C. The product was soluble in aqueous acid solution, and was insoluble in acetone, water, methanol, benzene, chloroform, petroleum ether, dimethylformamide, diethyl ether, dimethylsulfoxide, tetrahydrofuran, and aqueous sodium hydroxide.

EXAMPLE 8

*Reaction of titanium tetraisopropoxide with N,N,N',N'-tetrakis(2-hydroxyethyl) - 2,3,5,6 - tetrachloro-para-xylylenediamine*

N,N,N',N'-tetrakis(2-hydroxyethyl)-2,3,5,6-tetrachloro-para-xylylenediamine (6.75 grams, 0.15 mole) was reacted with an equimolar quantity of titanium tetraisopropoxide. The heavy white precipitate which formed was dried in a vacuum oven.

At a temperature of 350° C. the resinous product darkened but remained a solid. The resin was soluble in aqueous acid solution and insoluble in water, acetone, methanol, benzene, chloroform, petroleum ether, dimethylformamide, diethyl ether, dimethylsulfoxide, tetrahydrofuran, and aqueous sodium hydroxide.

What is claimed is:

1. A class of chelate polymers consisting essentially of the recurring structure:

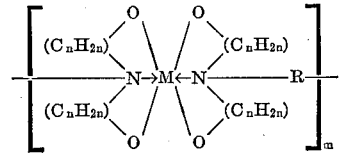

wherein M is selected from the group consisting of titanium, tin, and silicon, R is a member selected from the group consisting of aliphatic and aromatic divalent radicals containing between 2 and about 20 carbon atoms, $m$ is a whole integer having a value of at least 2, and $n$ is an integer selected from 2 and 3, with the proviso that M is silicon when the nitrogen atoms of the recurring chelate units are separated by R of 2 carbon chain length.

2. A process for producing chelate polymers which comprises reacting a tetraalkoxide of a member selected from the group consisting of titanium, tin, and silicon with a N,N,N',N'-tetrakis(hydroxyalkyl)diamine of the formula:

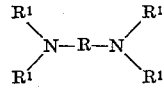

wherein R is a member selected from the group consisting of a divalent aliphatic and a divalent aromatic radical having from 2 to about 20 carbon atoms; and each $R^1$ is hydroxyalkyl, provided however that the tetraalkoxide is that of silicon where R has 2 carbon atoms, said hydroxyalkyl having from 2 to 3 carbon atoms.

3. The process of claim 2 wherein the tetraalkoxide is silicon tetraethoxide and the diamine is N,N,N',N'-tetrakis(2-hydroxyethyl)ethylenediamine.

4. The process of claim 2 wherein the tetraalkoxide is silicon tetraethoxide and the diamine is N,N,N',N'-tetrakis(2-hydroxyethyl)-para-phenylenediamine.

5. The process of claim 2 wherein the tetraalkoxide is titanium tetraisopropoxide and the diamine is N,N,N',N'-tetrakis(2-hydroxyethyl)-para-phenylenediamine.

6. The process of claim 2 wherein the tetraalkoxide is tin tetraethoxide and the diamine is N,N,N',N'-tetrakis(2-hydroxyethyl)-para-phenylenediamine.

7. The process of claim 2 wherein the tetraalkoxide is silicon tetraethoxide and the diamine is N,N,N',N'-tetrakis(2-hydroxyethyl)hexamethylenediamine.

8. The process of claim 2 wherein the tetraalkoxide is tin tetraethoxide and the diamine is N,N,N',N'-tetrakis(2-hydroxyethyl)hexamethylenediamine.

9. The process of claim 2 wherein the tetraalkoxide is titanium tetraisopropoxide and the diamine is N,N,N',N'-tetrakis(2-hydroxyethyl)hexamethylenediamine.

10. The process of claim 2 wherein the tetraalkoxide is titanium tetraisopropoxide and the diamine is N,N,N',N'-tetrakis(2 - hydroxyethyl) - 2,3,5,6 - tetrachloro - para-xylylenediamine.

11. A chelate polymer consisting essentially of the recurring structure:

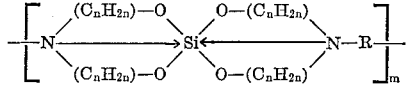

wherein R is a member selected from the group consisting of a divalent aliphatic and a divalent aromatic radical having from 2 to 20 carbon atoms; $m$ is an integer having a value of at least 2; and $n$ is an integer from 2 to 3.

12. A chelate polymer consisting essentially of the recurring structure:

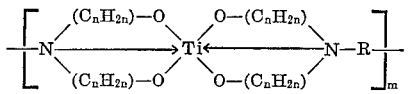

wherein R is a member selected from the group consisting of a divalent aliphatic and a divalent aromatic radical having from 3 to 20 carbon atoms; $m$ is an integer having a value of at least 2; and $n$ is an integer from 2 to 3.

13. A chelate polymer consisting essentially of the recurring structure:

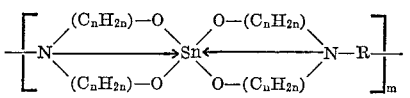

wherein Sn is tin; R is a member selected from the group consisting of a divalent aliphatic and a divalent aromatic radical having from 3 to 20 carbon atoms; $m$ is an integer having a value of at least 2; and $n$ is an integer from 2 to 3.

14. A process for producing chelate polymers consisting essentially of the recurring structure

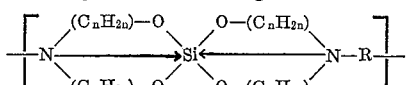

wherein R is a member selected from the group consisting of a divalent aliphatic and a divalent aromatic radical having from 2 to 20 carbon atoms; $m$ is an integer having a value of at least 2; and $n$ is an integer of from 2 to 3, which comprises reacting a lower tetraalkoxide of silicon with a diamine of the formula:

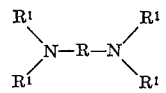

wherein R is a member selected from the group consisting of divalent aliphatic and divalent aromatic radicals having from 2 to 20 carbon atoms; and each of $R^1$ is hydroxyalkyl having from 2 to 3 carbon atoms.

15. A process for producing chelate polymers consisting essentially of the recurring structure

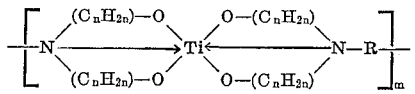

wherein R is a member selected from the group consisting of a divalent aliphatic and a divalent aromatic radical having from 3 to 20 carbon atoms; $m$ is an integer having a value of at least 2; and $n$ is an integer of from 2 to 3, which comprises reacting a lower tetraalkoxide of titanium with a diamine of the formula

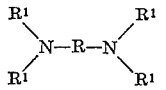

wherein R is a member selected from the group consisting of divalent radicals having from 3 to 20 carbon atoms; and each of $R^1$ is hydroxyalkyl having from 2 to 3 carbon atoms.

16. A process for producing chelate polymers consisting essentially of the recurring structure

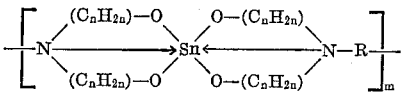

wherein Sn is tin; R is a member selected from the group consisting of a divalent aliphatic and aromatic radical having from 3 to 20 carbon atoms; $m$ is an integer having a value of at least 2; and $n$ is an integer of from 2 to 3, which comprises reacting a lower tetraalkoxide of tin with a diamine of the formula:

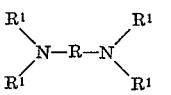

wherein R is a member selected from the group consisting of a divalent aliphatic and a divalent aromatic radical having from 3 to 20 carbon atoms and each $R^1$ is hydroxyalkyl having 2 to 3 carbon atoms.

References Cited by the Examiner

UNITED STATES PATENTS

| | | | |
|---|---|---|---|
| 2,053,474 | 9/1936 | Graves et al. | 260—2 |
| 2,941,981 | 6/1960 | Elbling et al. | 260—448.8 |
| 2,976,307 | 3/1961 | Rudner et al. | 260—2 |
| 3,118,921 | 1/1964 | Samour | 260—448.2 |
| 3,133,108 | 5/1964 | Finestone | 260—448.2 |

SAMUEL H. BLECH, *Primary Examiner.*

MURRAY TILLMAN, *Examiner.*